April 28, 1931.  A. F. FROUSSARD  1,802,342

SHAFT COUPLING

Filed Dec. 19, 1929

Inventor
A. F. Froussard
By E. E. Huffman
Att'y.

Patented Apr. 28, 1931

1,802,342

UNITED STATES PATENT OFFICE

ALBERT F. FROUSSARD, OF ST. LOUIS, MISSOURI

SHAFT COUPLING

Application filed December 19, 1929. Serial No. 415,182.

My invention relates to a shaft coupling of the pin and disk type for coupling sections of shafting which may be either slightly out of line or slightly eccentric or both. One object of my invention is to produce a simple and strong coupling having a smooth exterior free from projection of any kind. Another object of my invention is to so construct the coupling that it may be utilized to electrically insulate one section of the shaft from another.

Figure 1:
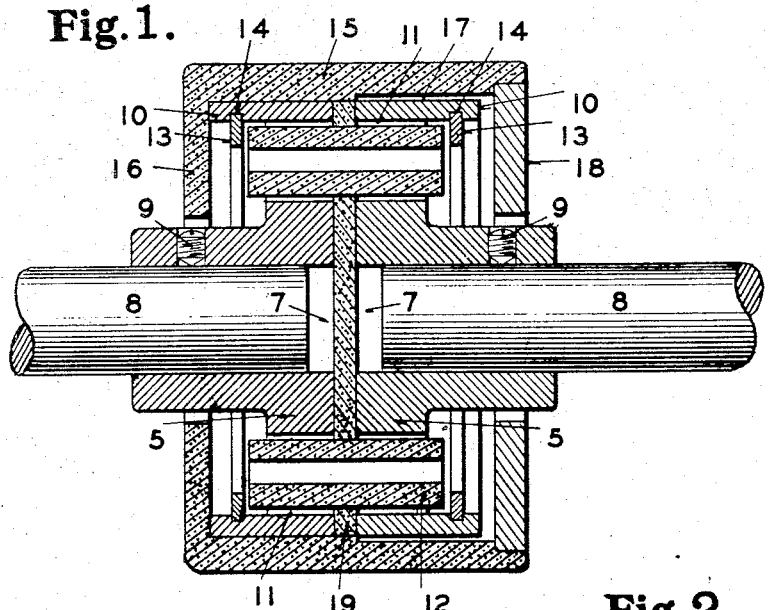
Figure 2:
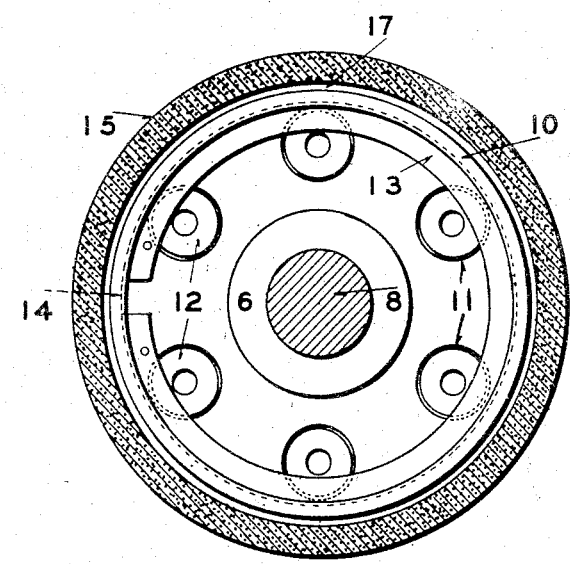
Figure 3:
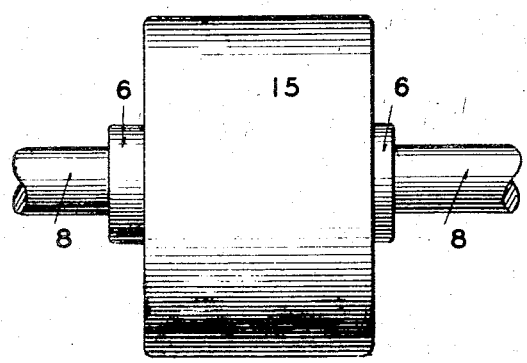

In the accompanying drawings, which illustrate one form of coupling made in accordance with my invention, Figure 1 is a central longitudinal section; Figure 2 is an end view, partly in section and partly in elevation; and Figure 3 is a side elevation on a reduced scale.

The coupling comprises two similar disks 5, each provided with a hub 6 and having a central opening 7 for the reception of one end of a section of shaft 8. The disks are rigidly secured to the shafts in any suitable manner, as for example, by means of set screws 9 in the hubs 6. Each disk is formed of a central portion and a laterally projecting flange 10. Formed in the central part of each disk is a series of equidistantly spaced holes 11. The two disks are connected, after the holes 11 have been brought into alignment, by pins 12. These pins, which are preferably tubular in form, are made of fiber or other non-metallic material for the double purpose of avoiding electrical connection between the disks and preventing noisy operation which would result from the use of metallic pins, owing to the play necessary between the pins and holes to provide the desired flexibility. The pins terminate in recesses formed by the overhang of the flanges 10 and have this longitudinal movement limited by split retaining rings 13 formed of resilient material and sprung into annular grooves 14 in the inner faces of the flanges 10.

Surrounding the two disks is a cylindrical shell or casing 15, one end of which is secured to one of the disks, preferably by having its bore of such size as to form a forced fit therewith. This end of the shell is provided with an integral radial flange 16 extending nearly to the hub 6. The bore in the opposite end of the shell is enlarged so as to provide a space 17 around the disk at the end to allow for the necessary relative movement between the disks, and a removable flange 18 is provided at this end of the device, preferably having a driving fit with a further enlargement of the bore. When it is desired to electrically insulate the sections of the shaft the shell is made of fiber, or other insulating material, and a thin disk 19 also of insulating material is positioned between the disks 5.

Having fully described my invention, what I claim as new and desire to secure by Letters Patent of the United States is:

1. In a device of the class described, the combination with a pair of disks, of means for securing said disks to the sections of shaft to be coupled, said disks being provided with aligning pin openings, connecting pins in said openings, a flange on each of said disks extending laterally therefrom at a point beyond the pin openings and overhanging the ends of the pins in said openings, and spring rings engaging the inner faces of said flanges to limit the longitudinal movement of said pins.

2. In a device of the class described, the combination with a pair of disks, of means for securing said disks to the sections of shaft to be coupled, said disks being provided with aligning pin openings, insulating connecting pins in said openings, an insulating shell surrounding said disks and secured to one but spaced from the other, a pair of radial flanges carried by said shell, one of said flanges being removable, and an insulating disk situated between said first named disks.

In testimony whereof, I hereunto affix my signature, this 17th day of December, 1929.

ALBERT F. FROUSSARD.